United States Patent
Chen et al.

(10) Patent No.: US 12,288,905 B2
(45) Date of Patent: Apr. 29, 2025

(54) ONLINE OBSERVATION METHOD OF ANODE NITROGEN CONCENTRATION FOR PROTON EXCHANGE MEMBRANE FUEL CELL

(71) Applicant: ZHEJIANG UNIVERSITY, Hangzhou (CN)

(72) Inventors: Jian Chen, Hangzhou (CN); Zhiyang Liu, Hangzhou (CN); Chizhou Yan, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 974 days.

(21) Appl. No.: 17/419,728

(22) PCT Filed: Jun. 29, 2020

(86) PCT No.: PCT/CN2020/098783
§ 371 (c)(1),
(2) Date: Jun. 30, 2021

(87) PCT Pub. No.: WO2021/143054
PCT Pub. Date: Jul. 22, 2021

(65) Prior Publication Data
US 2022/0231313 A1     Jul. 21, 2022

(30) Foreign Application Priority Data
Jan. 19, 2020   (CN) .......................... 202010060664.2

(51) Int. Cl.
G06F 111/10    (2020.01)
H01M 8/04298   (2016.01)
(Continued)

(52) U.S. Cl.
CPC .... *H01M 8/04305* (2013.01); *H01M 8/04447* (2013.01); *H01M 8/04992* (2013.01); *G06F 2111/10* (2020.01)

(58) Field of Classification Search
CPC ......... H01M 8/04305; H01M 8/04447; H01M 8/04992; H01M 2008/1095;
(Continued)

(56) References Cited

U.S. PATENT DOCUMENTS 7,736,814 B2 * 6/2010 Igarashi ............ H01M 8/04225
                                                429/429
7,829,233 B2 * 11/2010 Kizaki .............. H01M 8/04225
                                                429/444

FOREIGN PATENT DOCUMENTS

CN    101330154 A    12/2008
CN    109815554 A     5/2019
(Continued)

OTHER PUBLICATIONS

Phiyang Liu, et al., Anode purge management for hydrogen utilization and stack durability improvement of PEM fuel cell systems, Applied Energy, 2020, pp. 1-11, 275, 115110.

*Primary Examiner* — Juan C Ochoa
(74) *Attorney, Agent, or Firm* — Bayramoglu Law Offices LLC

(57) ABSTRACT

An online observation method of an anode nitrogen concentration for a proton exchange membrane fuel cell is disclosed. Firstly, a dynamic model of anode nitrogen concentration is established based on a gas transmembrane penetration model and an anode material conservation model of a fuel cell, and then an average voltage degradation value between a nitrogen partial pressure and an average monolithic cell voltage is obtained as online feedback information, an online observer of anode nitrogen concentration is established based on the dynamic model of anode nitrogen
(Continued)

concentration and the online feedback information, and the anode nitrogen concentration of the fuel cell is obtained by the online observer. The new method solves the problem of online observation of anode nitrogen concentration during the operation of a proton exchange membrane fuel cell engine system under dynamic conditions.

3 Claims, 3 Drawing Sheets

(51) Int. Cl.
*H01M 8/0444* (2016.01)
*H01M 8/04992* (2016.01)

(58) Field of Classification Search
CPC .......... H01M 8/04589; H01M 8/0488; H01M 8/0491; H01M 8/04559; H01M 8/0444; G06F 2111/10; Y02E 60/50
USPC ............................................................ 703/2
See application file for complete search history.

(56) References Cited

FOREIGN PATENT DOCUMENTS

| | | | |
|---|---|---|---|
| CN | 109918689 | A | 6/2019 |
| CN | 110706752 | A | 1/2020 |
| CN | 111310306 | A | 6/2020 |
| EP | 2108119 | B1 | 1/2012 |

* cited by examiner

ONLINE OBSERVATION METHOD OF ANODE NITROGEN CONCENTRATION FOR PROTON EXCHANGE MEMBRANE FUEL CELL

CROSS REFERENCE TO THE RELATED APPLICATIONS

This application is the national phase entry of International Application No. PCT/CN2020/098783, filed on Jun. 29, 2020, which is based upon and claims priority to Chinese Patent Application No. 202010060664.2, filed on Jan. 19, 2020, the entire contents of which are incorporated herein by reference.

TECHNICAL FIELD

The present invention belongs to a fuel cell online measurement method in the field of fuel cell applications, and in particular, relates to an online observation method of an anode nitrogen concentration for a proton exchange membrane fuel cell.

BACKGROUND

In recent years, with the rapid growth of global automobile ownership, energy and environmental issues have become increasingly prominent, and have aroused widespread concern in today's society. As an important source of environmental pollution emissions, automobiles also shoulder responsibilities such as improving traffic, protecting the environment, and saving energy. It is highly desirable for China's automobile industry to develop energy-saving and new energy vehicles, and the automobile industry has entered a critical period of transformation. Fuel cell vehicles are one of the important development directions of new energy vehicles. The fuel cell power generation system is one of the key components of the fuel cell vehicles. Performance research, control strategy design and applications thereof are of great significance to improve the overall performance of the fuel cell vehicles and reduce the production cost of the fuel cell vehicles. However, many key parameters in fuel cells cannot be obtained directly through sensors during online operation of the existing fuel cell engines, which limits the application of advanced control methods to the fuel cell engines to some extent.

In order to improve the utilization of hydrogen in the fuel cell engines, a dead-end mode is used at the anode during the operation of the fuel cell engines. In this mode, nitrogen from the cathode may accumulate in an anode cavity continuously, so it is impossible to achieve accurate and online observation of the anode nitrogen concentration, and it is impossible to achieve effective purge. However, at present, there is no stable online observation of the anode nitrogen concentration in existing studies.

SUMMARY

In order to solve the problems existing in the prior art, the present invention provides an online observation method of an anode nitrogen concentration for a proton exchange membrane fuel cell, and provides an application method of this observer under dynamic conditions based on operation characteristics of fuel cell engines, which solves the problem of online observation of anode nitrogen concentration during the operation of a proton exchange membrane fuel cell engine system, and stably and accurately performs the online observation of anode nitrogen concentration.

As shown in FIG. 2, the technical solution adopted by the present invention is as follows:

Firstly, establishing a dynamic model of the anode nitrogen concentration based on a gas transmembrane penetration model and an anode material conservation model of a fuel cell, and then processing to obtain an average voltage degradation value between a nitrogen partial pressure and an average monolithic cell voltage as online feedback information, establishing an online observer of the anode nitrogen concentration based on the dynamic model of the anode nitrogen concentration and the online feedback information to obtain the anode nitrogen concentration of the fuel cell by the online observer.

The present invention extracts a nitrogen penetration rate of a fuel cell membrane electrode varying with a current density under operation conditions of predetermined temperature and gas humidity. The dynamic model of the anode nitrogen concentration is more accurately described based on the anode material conservation model.

The average voltage degradation value between the nitrogen partial pressure and the average monolithic cell voltage is based on the deformation of a Nernst equation of the proton exchange membrane fuel cell, which directly represents a relationship between hydrogen concentration changes and voltage dynamic changes.

The method specifically includes the following steps:

1) establishing the dynamic model of the anode nitrogen concentration:

firstly, for a membrane electrode of a monolithic cell in the fuel cell, taking a penetration coefficient $k_{N_2}$ of the membrane electrode to nitrogen as a function $f(I_{st})$ of an output current $I_{st}$ of the fuel cell under conditions of a fixed temperature and a fixed gas humidity:

$$k_{N_2} = f(I_{st})$$

next, when the penetration coefficient of the membrane electrode to nitrogen is known, calculating a nitrogen gas transmembrane penetration rate $F_{N_2}$ according to the penetration coefficient $k_{N_2}$, and a pressure difference between a cathode nitrogen partial pressure $P_{N_2,ca}$ and an anode nitrogen partial pressure $P_{N_2,an}$ of the fuel cell:

$$F_{N_2} = k_{N_2}(P_{N_2,ca} - P_{N_2,an})$$

then, establishing the following dynamic model of the anode nitrogen concentration according to an operating temperature $T_{an}$ of an anode of the fuel cell, a gas constant parameter R, and a volume $V_{an}$ of an anode loop of the fuel cell:

$$P_{N_2,an} = \frac{RT_{an}}{V_{an}} F_{N_2}$$

2) constructing a fuel cell Nernst equation of a fuel cell voltage according to the dynamic model of the anode nitrogen concentration to obtain an ideal value of a monolithic cell voltage between the nitrogen partial pressure and the average voltage:

$$V_{avgcell} = E_0 + b_0 \left( \ln \frac{P_{an} - P_{N_2,an}}{P_0} + \frac{1}{2} \ln \frac{P_{c,O_2}}{P_0} \right) - v_{ohm} - v_{act} - v_{con}$$

Where, $V_{avgcell}$ denotes the ideal value of the average monolithic cell voltage, $E_0$ denotes a reversible voltage of the monolithic cell in an ideal state, $b_0$ denotes a gas pressure parameter, $P_{an}$ denotes an anode pressure, $P_{N_2,an}$ denotes an anode nitrogen partial pressure, $P_{c,O_2}$ denotes a cathode oxygen partial pressure, $P_0$ denotes atmospheric pressure, $v_{ohm}$ denotes an ohmic loss voltage of the monolithic cell, $v_{act}$ denotes a polarization loss voltage of the monolithic cell, and $v_{con}$ denotes a concentration loss voltage of the monolithic cell;

according to the monolithic cell voltage, obtaining the average voltage degradation value $\Delta V_{avgcell}$ between the anode nitrogen partial pressure and the average monolithic cell voltage according to a difference between a reference monolithic cell voltage with the anode nitrogen concentration of 0 and the monolithic cell voltage in the presence of oxygen and the nitrogen concentration $P_{N_2,an}$:

$$\Delta V_{avgcell} = b_0 \ln \frac{P_{an} - P_{N_2,an}}{P_0}$$

3) according to the gas transmembrane penetration model, the dynamic model of the anode nitrogen concentration, and variation in the anode nitrogen partial pressure and the average monolithic cell voltage, establishing the following online observer of the anode nitrogen concentration, and obtaining the anode nitrogen concentration of the fuel cell in real time by an observation of the online observer:

$$\hat{\alpha}_{N_2,an} = c_1 - c_2 \alpha_{N_2,an} + H(y(t) - \Delta V_{avgcell})$$

$$c_2 = \frac{RT_{an}k_{N_2}}{V_{an}}, \; c_1 = \frac{RT_{an}k_{N_2}P_{N_2,ca}}{V_{an}P_{an}}, \; \hat{\alpha}_{N_2,an} = \frac{P_{N_2,an}}{P_0}$$

where, $c_2$ and $c_1$ denote first and second constant parameters of the observer, $\hat{a}_{N_2,an}$ denotes an observed value of the anode nitrogen concentration; H denotes a gain parameter of the online observer, $\Delta V_{avgcell}$ denotes the average voltage degradation value, and y(t) denotes a measured average monolithic cell voltage degradation value, calculated by the following formula:

$$y(t) = V(t) - V^*$$

where, V(t) denotes a current average monolithic cell voltage measured value, and V* denotes an ideal value of an average monolithic voltage under a current operation condition.

The anode nitrogen concentration obtained by the present invention is used as a feedback quantity of fuel cell gas purge, thus helping to accurately control the anode purge in the fuel cell and improve the utilization of hydrogen.

The present invention, based on the above online observer, further provides a method for selecting the ideal value of the average monolithic voltage under the current operation condition as shown in FIG. 2: the current of the fuel cell undergoes a step change or the anode of the fuel cell undergoes a purge for a transition time of t which is generally 0.5-1 s, and after the voltage measured value is stable, which means that a difference between voltage measured values V(t) in two consecutive measurements is within 5 mV, a stable average monolithic voltage measured value V(t) is selected as the ideal value of the average monolithic voltage under the current operation condition. This can solve the problem of selecting the ideal value of the average monolithic voltage of the fuel cell under a current operation condition of different output currents and the problem of fluctuation of the average monolithic voltage of the fuel cell in a period of time after the discharge of excess nitrogen from the fuel cell, thereby avoiding the failure of the feedback of the observer caused by the voltage fluctuation under dynamic conditions.

The present invention has the following advantages:

The present invention solves the problem of online observation of anode nitrogen concentration during the operation of a proton exchange membrane fuel cell engine system under dynamic conditions. Compared with the existing observer that can only solve the problem of nitrogen concentration observation under partial constant current conditions, the observer provided by the present invention, based on the method of selecting the ideal value of the average monolithic voltage under the current operation condition provided in the present invention, and has broad application prospects in anode purge of fuel cell engines, health monitoring and control of fuel cells.

DETAILED DESCRIPTION OF THE EMBODIMENTS

The present invention is further described below with reference to the accompanying drawings and embodiments.

According to the method for implementing a nitrogen concentration observer described in summary of the present invention, the observer is realized in a computer program of an experimental bench.

1) The dynamic model of anode nitrogen concentration is established.

Firstly, for a membrane electrode of a monolithic cell in the fuel cell, a penetration coefficient $k_{N_2}$ of the membrane electrode to nitrogen is taken as a function $f(I_{st})$ of an output current $I_{st}$ of the fuel cell under conditions of a fixed temperature and a fixed gas humidity.

Next, when the penetration coefficient of the membrane electrode to nitrogen is known, a nitrogen gas transmembrane penetration rate $F_{N_2}$ is calculated according to the penetration coefficient $k_{N_2}$, and a pressure difference between a cathode nitrogen partial pressure $P_{N_2,ca}$ and an anode nitrogen partial pressure $P_{N_2,an}$ of the fuel cell.

Then, the following dynamic model of the anode nitrogen concentration is established according to an operating temperature $T_{an}$ of an anode of the fuel cell, a gas constant parameter R, and a volume $V_{an}$ of an anode loop of the fuel cell.

2) An ideal value of a monolithic cell voltage between the nitrogen partial pressure and the average voltage is obtained according to the dynamic model of anode nitrogen concentration; then, the average voltage degradation value $\Delta V_{avgcell}$ between the anode nitrogen partial pressure and the average monolithic cell voltage is obtained according to a difference between a reference monolithic cell voltage with the anode nitrogen concentration of 0 and the monolithic cell voltage in the presence of oxygen and the nitrogen concentration $P_{N_2,an}$.

3) The following online observer of the anode nitrogen concentration is established, and the anode nitrogen concentration of the fuel cell is obtained in real time by an observation of the online observer.

In specific implementation, the current of the fuel cell undergoes a step change or the anode of the fuel cell undergoes a purge for a transition time of t, and after the voltage measured value is stable, a stable average monolithic voltage measured value V(t) is selected as the ideal value of the average monolithic voltage under the current operation condition.

Figure 1:
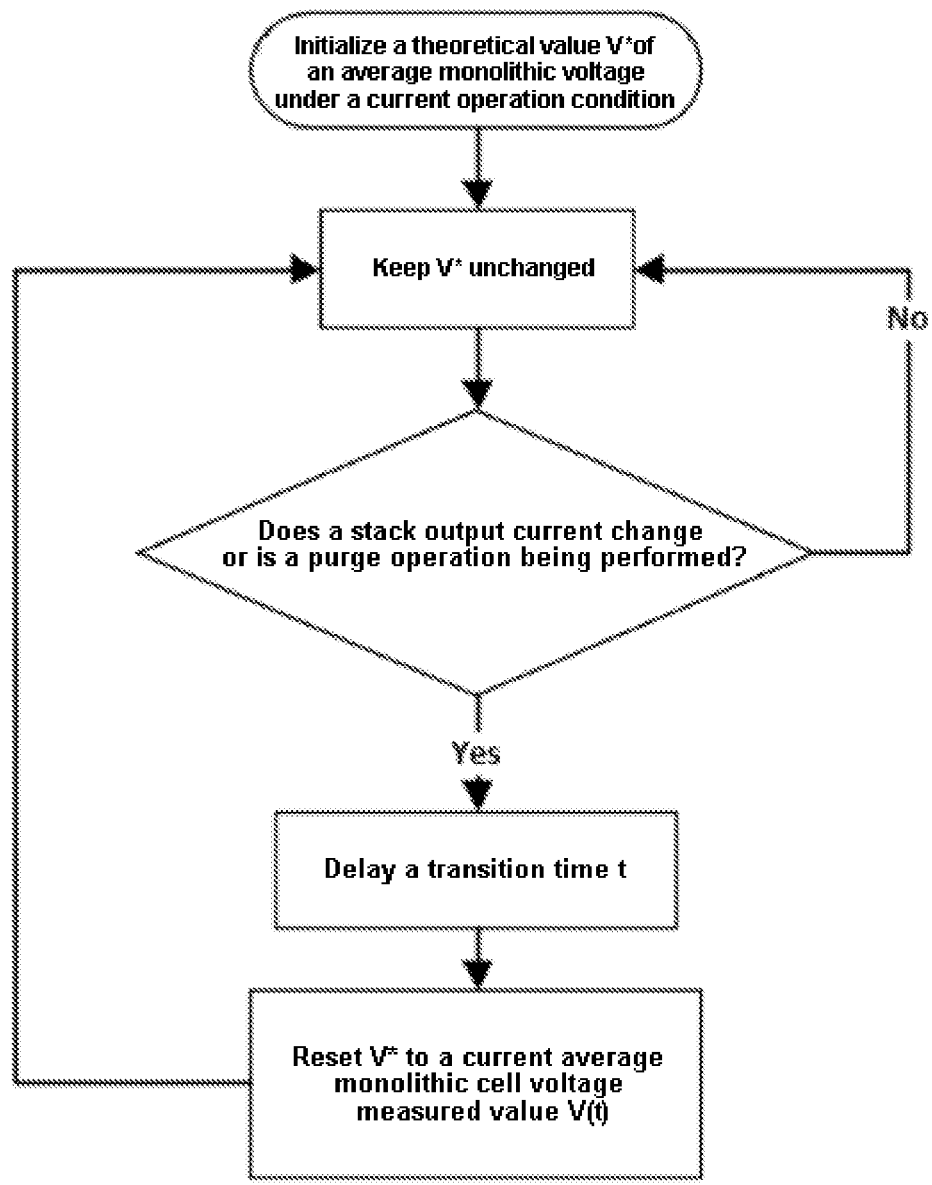
FIG. 1 shows a method for selecting an ideal value of an average monolithic voltage under a current operation condition for an observer in the present invention.
Figure 2:
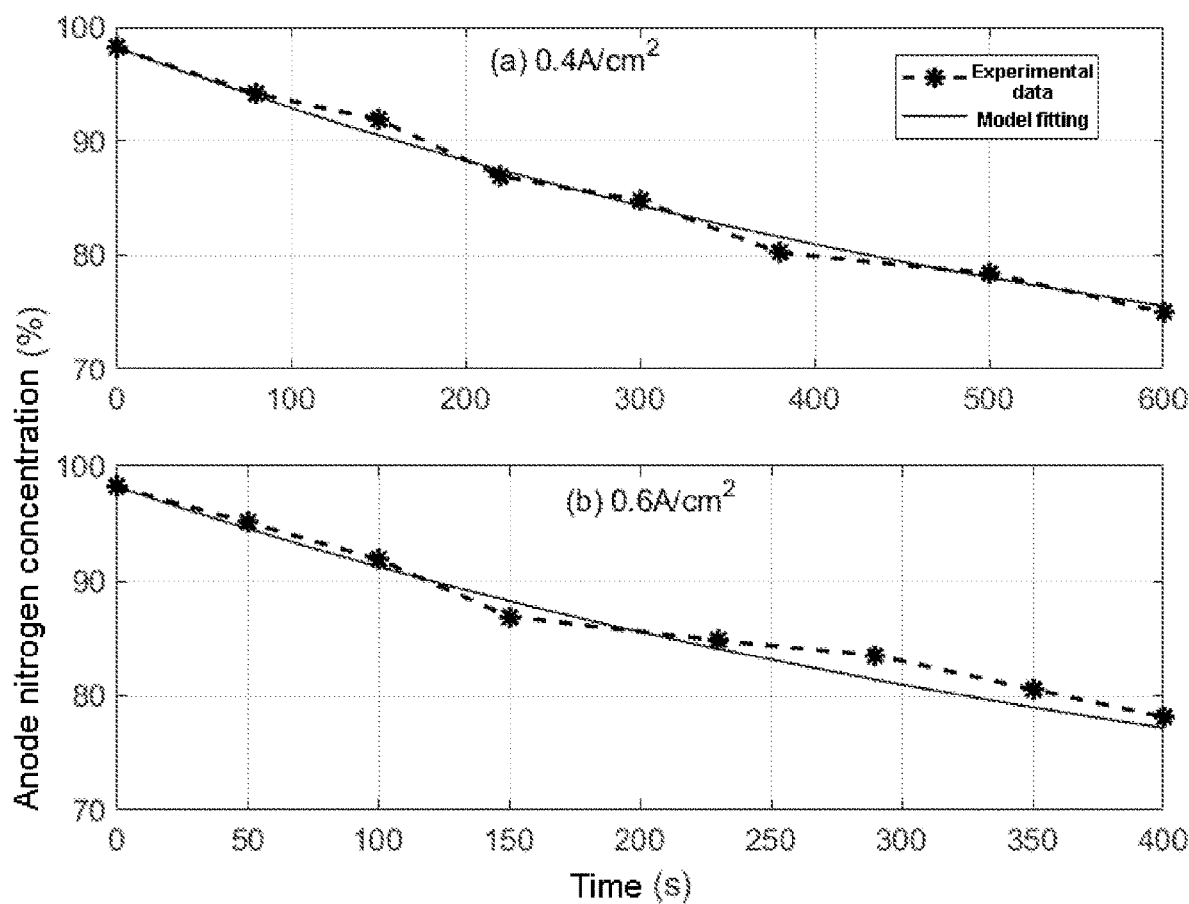
FIG. 2 shows results of experimental identification of nitrogen penetration coefficients according to an embodiment of the present invention.
Figure 3:
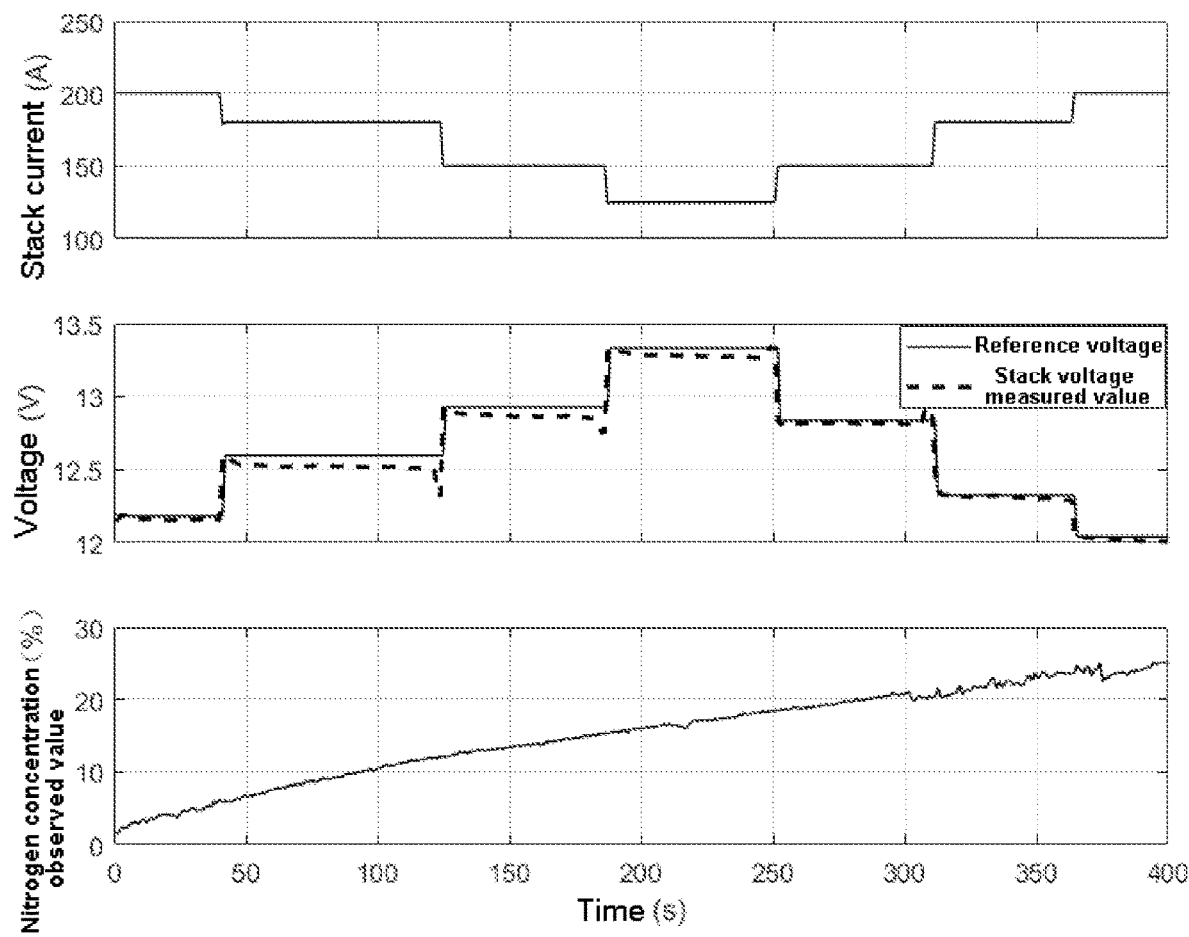
FIG. 3 shows a change curve of fuel cell outputs and gas concentrations within a purge cycle according to an embodiment of the present invention.

In order to obtain a penetration coefficient of nitrogen in a membrane electrode, an experiment is conducted to identify the penetration coefficient of nitrogen in the membrane electrode. When other conditions remain unchanged, the penetration coefficient of nitrogen varies linearly with the current density in a working range, and a changing curve is estimated by obtaining experimental values of two points. Under the current density of 0.4 A/cm², the penetration coefficient of nitrogen is identified as $1.490 \times 10^{-9}$ mol/(Pa·s). Under the current density of 0.6 A/cm², the penetration coefficient of nitrogen is identified as $1.994 \times 10^{-9}$ mol/(Pa·s). Then, the observer provided in the present invention is realized in a controller. During the experiment, a constant metering ratio of 2.5 is set for the cathode, the oxygen content in the test environment is 21%, the anode pressure and the cathode pressure are set according to reference values of a fuel cell manufacturer, a fuel cell coolant inlet temperature is controlled at 60° C.±0.5° C., and a fuel cell coolant outlet temperature is controlled at 65° C.±0.5° C. Implementation results of examples are as shown in FIG. 3. In FIG. 3, in one purge cycle, step changes of load are carried out several times, and a reference voltage is re-selected based on the algorithm in FIG. 1 in each change process. The whole purge cycle is not affected by load changes, and finally the nitrogen concentrations under the whole working condition are observed continuously.

What is claimed is:

1. An online observation method of an anode nitrogen concentration for an anode of a proton exchange membrane fuel cell, comprising:
   establishing, by a computer associated with a controller, a dynamic model of the anode nitrogen concentration based on a gas transmembrane penetration model and an anode material conservation model of the proton exchange membrane fuel cell, and then obtaining an average voltage degradation value between a nitrogen partial pressure and an average monolithic cell voltage as online feedback information, establishing an online observer of the anode nitrogen concentration based on the dynamic model of the anode nitrogen concentration and the online feedback information to obtain the anode nitrogen concentration of the proton exchange membrane fuel cell by the online observer; and
   controlling, by the controller, purging of the anode according to the obtained anode nitrogen concentration of the proton exchange membrane fuel cell.

2. The online observation method of the anode nitrogen concentration for the proton exchange membrane fuel cell according to claim 1, wherein the online observation method specifically comprises the following steps:
   1) establishing the dynamic model of the anode nitrogen concentration:

for a membrane electrode of a monolithic cell in the proton exchange membrane fuel cell, taking a penetration coefficient $k_{N_2}$ of the membrane electrode to nitrogen as a function $f(I_{st})$ of an output current $I_{st}$ of the proton exchange membrane fuel cell under conditions of a fixed temperature and a fixed gas humidity:

$$k_{N_2} = f(I_{st})$$

when the penetration coefficient of the membrane electrode to the nitrogen is known, calculating a nitrogen gas transmembrane penetration rate $F_{N_2}$ according to the penetration coefficient $k_{N_2}$, and a pressure difference between a cathode nitrogen partial pressure $P_{N_2,ca}$ and an anode nitrogen partial pressure $P_{N_2,an}$ of the proton exchange membrane fuel cell:

$$F_{N_2} = k_{N_2}(P_{N_2,ca} - P_{N_2,an})$$

establishing the following dynamic model of the anode nitrogen concentration according to an operating temperature $T_{an}$ of an anode of the proton exchange membrane fuel cell, a gas constant parameter R, and a volume $V_{an}$ of an anode loop of the proton exchange membrane fuel cell:

$$P_{N_2,an} = \frac{RT_{an}}{V_{an}} F_{N_2}$$

2) obtaining an ideal value of the average monolithic cell voltage between the nitrogen partial pressure and an average voltage according to the dynamic model of the anode nitrogen concentration:

$$V_{avgcell} = E_0 + b_0 \left( \ln \frac{P_{an} - P_{N_2,an}}{P_0} + \frac{1}{2} \ln \frac{P_{c,O_2}}{P_0} \right) - v_{ohm} - v_{act} - v_{con}$$

wherein, $V_{avgcell}$ denotes the ideal value of the average monolithic cell voltage, $E_0$ denotes a reversible voltage of the monolithic cell in an ideal state, $b_0$ denotes a gas pressure parameter, $P_{an}$ denotes an anode pressure, $P_{N_2,an}$ denotes the anode nitrogen partial pressure, $P_{c,O_2}$ denotes a cathode oxygen partial pressure, $P_0$ denotes atmospheric pressure, $v_{ohm}$ denotes an ohmic loss voltage of the monolithic cell, $v_{act}$ denotes a polarization loss voltage of the monolithic cell, and $v_{con}$ denotes a concentration loss voltage of the monolithic cell;

obtaining the average voltage degradation value $\Delta V_{avgcell}$ between the anode nitrogen partial pressure and the average monolithic cell voltage according to a difference between a reference monolithic cell voltage with the anode nitrogen concentration of 0 and the average monolithic cell voltage in a presence of oxygen and the nitrogen concentration $P_{N_2,an}$:

$$\Delta V_{avgcell} = b_0 \ln \frac{P_{an} - P_{N_2,an}}{P_0}$$

3) establishing the following online observer of the anode nitrogen concentration to obtain the anode nitrogen concentration of the proton exchange membrane fuel cell in real time by an observation of the online observer:

$$\hat{a}_{N_2,an} = c_1 - c_2 \alpha_{N_2,an} + H(y(t) - \Delta V_{avgcell})$$

$$c_2 = \frac{RT_{an}k_{N_2}}{V_{an}}, \quad c_1 = \frac{RT_{an}k_{N_2}P_{N_2,ca}}{V_{an}P_{an}}, \quad \hat{\alpha}_{N_2,an} = \frac{P_{N_2,an}}{P_0}$$

wherein, $c_2$ and $c_1$ denote a first constant parameter and a second constant parameter of the online observer, respectively, $\hat{a}_{N_2,an}$ denotes an observed value of the anode nitrogen concentration; H denotes a gain parameter of the online observer, $\Delta V_{avgcell}$ denotes the average voltage degradation value, and y(t) denotes a measured average monolithic cell voltage degradation value, and the y(t) is calculated by the following formula:

$$y(t) = V(t) - V^*$$

wherein, V(t) denotes a current average monolithic cell voltage measured value, and V* denotes an ideal value of an average monolithic voltage under a current operation condition.

3. The online observation method of the anode nitrogen concentration for the proton exchange membrane fuel cell according to claim 2, wherein a current of the proton exchange membrane fuel cell undergoes a step change or the anode of the proton exchange membrane fuel cell undergoes a purge for a transition time of t, and after a voltage measured value is stable, the current average monolithic cell voltage measured value V(t) after stabilization is selected as the ideal value of the average monolithic voltage under the current operation condition.

* * * * *